United States Patent [19]

Koike et al.

[11] Patent Number: 5,124,718
[45] Date of Patent: Jun. 23, 1992

[54] INK-JET RECORDING PROCESS USING INK

[75] Inventors: Shoji Koike, Yokohama; Yasuko Tomida, Atsugi, both of Japan

[73] Assignee: Canon Kabushiki Kaisha, Tokyo, Japan

[21] Appl. No.: 345,655

[22] Filed: May 1, 1989

Related U.S. Application Data

[62] Division of Ser. No. 124,060, Nov. 23, 1987, Pat. No. 4,853,036.

Foreign Application Priority Data

Nov. 25, 1986 [JP] Japan ................................ 61-280273
Nov. 25, 1986 [JP] Japan ................................ 61-280274

[51] Int. Cl.$^5$ ...................... G01D 15/16; C09D 11/02
[52] U.S. Cl. ................... 346/1.1; 346/140 R; 106/20; 106/22
[58] Field of Search ............. 346/1.1, 140 R, 175; 106/20, 22

[56] References Cited

U.S. PATENT DOCUMENTS

| | | | |
|---|---|---|---|
| 3,846,141 | 11/1974 | Ostergren | 106/22 |
| 3,856,536 | 12/1974 | Siegelman et al. | 106/22 |
| 3,870,528 | 3/1975 | Edds et al. | 106/22 |
| 4,024,096 | 5/1977 | Wachtel | 106/22 |
| 4,070,322 | 1/1978 | Hwang et al. | 106/22 |
| 4,136,076 | 1/1979 | Daniels | 106/22 X |
| 4,195,104 | 3/1980 | Fell | 427/261 |
| 4,338,133 | 7/1982 | Toyoda et al. | 106/22 |
| 4,395,287 | 7/1983 | Kobayashi et al. | 106/20 |
| 4,597,794 | 7/1986 | Ohta et al. | 106/20 X |

FOREIGN PATENT DOCUMENTS

| | | |
|---|---|---|
| 0044378 | 1/1982 | European Pat. Off. |
| 0059827 | 9/1982 | European Pat. Off. |
| 0202656 | 11/1986 | European Pat. Off. |
| 0211278 | 2/1987 | European Pat. Off. |
| 3147592 | 7/1982 | Fed. Rep. of Germany |
| 3432823 | 3/1985 | Fed. Rep. of Germany |
| 3433508 | 3/1985 | Fed. Rep. of Germany |
| 56-11974 | 2/1981 | Japan |
| 56-104977 | 8/1981 | Japan |
| 56-129274 | 10/1981 | Japan |
| 57-23665 | 2/1982 | Japan |
| 57-94064 | 6/1982 | Japan |
| 57-145168 | 9/1982 | Japan |
| 57-164169 | 10/1982 | Japan |
| 58-101171 | 6/1983 | Japan |
| 58-185665 | 10/1983 | Japan |
| 59-174666 | 10/1984 | Japan |
| 60-49073 | 3/1985 | Japan |
| 2004904 | 4/1979 | United Kingdom |
| 2031448 | 4/1980 | United Kingdom |
| 1590159 | 5/1981 | United Kingdom |
| 2070049 | 9/1981 | United Kingdom |
| 2123019 | 1/1984 | United Kingdom |
| 2137219 | 10/1984 | United Kingdom |
| 2148316 | 5/1985 | United Kingdom |

OTHER PUBLICATIONS

Römpps Chemielexikon vol. 5, (8th edition), pp. 3290–3291.

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

An ink for ink-jet recording is provided which comprises a liquid composition essentially comprised of a coloring matter, a volatile solvent having a vapor pressure of 1 mmHg or more at 25° C., and a material being solid at room temperature and having a molecular weight of 300 or more; and prepared so as to satisfy formula $B_1/A_1 \geq 3$, assuming viscosity as $A_1$ cP at 25° C. measured when the content of the solid material in said composition is 10% by weight, and assuming viscosity as $B_1$ cP at 25° C. measured when the content of the solid material in said composition is 30% by weight. An ink-jet recording process employing the above-mentioned ink is also provided.

29 Claims, No Drawings

INK-JET RECORDING PROCESS USING INK

This application is a division of application Ser. No. 124,060 filed Nov. 23, 1987 now U.S. Pat. No. 4,853,036.

BACKGROUND OF THE INVENTION

1. Field of the Invention

The present invention relates to ink for ink-jet recording and process for carrying out recording on a recording medium with its droplets, and, particularly, to ink for ink-jet recording and an ink-jet recording process using the same that can perform good printing also on copying paper, report paper, notebooks, letter paper or the like generally used in offices.

2. Related Background Art

Hitherto, ink having quite a variety of composition has been reported in respect of ink for ink-jet printers.

In particular, detailed researches and development have been made from both viewpoints of composition and properties in respect of ink to be used for paper or cloth as the recording medium.

However, the conventional ink for ink-jet printers has had some problems, and it has been a greatest problem that the paper such as notebooks, report paper, copying paper and letter paper generally used in offices can not be used for the printing.

More specifically, if printing is carried out on the variety of the paper mentioned above with use of the conventional ink for ink-jet printers, the ink received for print runs and spreads over the paper along its fiber, so that the shape of dots may become irregular to cause the so-called feathering (or ink spreading). Accordingly, it has often occurred that thin ruled lines, small letters, complicated chinese characters defined as JIS second standard, etc. are unclearly printed and illegible.

Moreover, the above-mentioned paper is applied with a treatment called "sizing" in a paper-making step to suppress the occurrence of feathering when writing is performed with writing utensils with use of usual water-based ink for fountain pens. Accordingly, since in printing with ink-jet printers, the ink can not readily permeate into the paper and the printed part can be dried only, with poor drying performance, there has been the problem that print is rubbed with a cover of the printer and made unclean or hands are stained with ink when the print is touched.

Various improvements have now been attempted for the purpose of preventing the feathering and improving the drying performance of print. For example, Japanese Laid-open Patent Publication No. 57862/1981 discloses a method in which the pH of ink is made strongly alkaline, or the like method; Japanese Laid-open Patent Publication No. 29546/1980, a method in which a large amount of a surface active agent is added into ink; and Japanese Laid-open Patent Publication No. 108271/1983, a method in which an ink being solid at room temperature is heated and turned liquid to carry out recording.

However, the method in which the pH of ink is made strongly alkaline may be dangerous if the ink is touched by hands, and has disadvantages such that both the feathering and drying performance are not in good states with regard to the paper employing a certain kind of sizing agents. In the method in which a large amount of a surface active agent is added, there have been encountered the troubles such that the feathering may occur very frequently depending on the type of paper, the ink moves backward from the face of an orifice depending on the conditions for a print head, causing interruption of ejection of ink, or, on the contrary, the whole face of the orifice is wetted resulting also in no ejection of ink.

In the method in which an ink which is solid at room temperature is heated and turned liquid to carry out recording, though effective to a certain extent in respect of the feathering and drying performance of print, there have also been caused the problems that it requires, in designing a printer, a device for feeding ink while dissolving the ink or a heating unit provided in the printer head, resulting in making the printer large in size, and thus leaving problems in both the cost and ink-handling.

In addition to the above, various improvements have been attempted, but, at present, nothing has been known as to the ink and recording process that can settle all the above-mentioned problems of feathering, drying characteristic of print, large-sized print head, etc.

SUMMARY OF THE INVENTION

Accordingly, an object of the present invention is to provide an ink for ink-jet recording and an ink-jet recording process using the same, that can be used in the ink-jet printers of various types, and can solve the problems involved in conventional recording solutions, namely, the feathering and the slow drying of print that may occur when, not to speak of coated paper, printing is performed particularly on a recording medium comprising a recording face with fibers exposed thereon.

Another object of the present invention is to provide an ink for ink-jet recording that can promise high safety when used in offices or homes.

The above objects can be achieved by the present invention as described below.

The present invention provides an ink for ink-jet recording, comprising a liquid composition essentially comprised of a coloring matter, a volatile solvent having a vapor pressure of 1 mmHg or more at 25° C., and a material being solid at room temperature and having a molecular weight of 300 or more; and prepared so as to satisfy formula (I) shown below, assuming viscosity as $A_1$ cP at 25° C. measured when the content of the solid material in said composition is 10% by weight, and assuming viscosity as $B_1$ cP at 25° C. measured when the content of the solid material in said composition is 30% by weight:

$$B_1/A_1 \geq 3 \quad \text{(I)}.$$

In another embodiment, the ink for ink-jet recording comprises a liquid composition essentially comprised of a coloring matter, a volatile solvent having a vapor pressure of 1 mmHg or more at 25° C., a low-viscosity solvent having a vapor pressure of less than 1 mmHg and a viscosity of 10 cP or less at 25° C., and a solid material being solid at room temperature and having a molecular weight of 300 or more at room temperature; and prepared so as to satisfy formula (II) shown below, assuming viscosity as $A_2$ cP at 25° C. measured when the content of the solid material in said composition is 10% by weight, and assuming viscosity as $B_2$ cP at 25° C. measured when the content of the solid material in said composition is 30% by weight:

$$B_2/A_2 \geq 3 \quad \text{(II)}.$$

The present invention also provides an ink-jet recording process, comprising carrying out recording by adhering droplets of ink on a recording medium, wherein said recording medium comprises a recording face on which fibers are exposed, and said ink comprises a liquid composition essentially comprised of a coloring matter, a volatile solvent having a vapor pressure of 1 mmHg or more at 25° C., and a material being solid at room temperature and having a molecular weight of 300 or more, and is prepared so as to satisfy formula (III) shown below, assuming viscosity as $A_3$ cP at 25° C. measured when the content of the solid material in said composition is 10% by weight, and assuming viscosity as $B_3$ cP at 25° C. measured when the content of the solid material in said composition is 30% by weight:

$$B_3/A_3 \geq 3 \tag{III}$$

In another embodiment, the ink-jet recording process comprises carrying out recording by adhering droplets of ink on a recording medium, wherein said ink comprises a liquid composition essentially comprised of a coloring matter, a volatile solvent having a vapor pressure of 1 mmHg or more at 25° C., and a material being solid at room temperature and having a molecular weight of 300 or more at room temperature, and is prepared so as to satisfy formula (I) shown below, assuming viscosity as A cP at 25° C. measured when the content of the solid material in said composition is 10% by weight, and assuming viscosity as B cP at 25° C. measured when the content of the solid material in said composition is 30% by weight:

$$B/A \geq 3 \tag{I},$$

and the recording is carried out by heating up said ink.

DETAILED DESCRIPTION OF THE PREFERRED EMBODIMENTS

A feature of the present invention is that the solid material is contained in the ink and at the same time other components and the composition thereof are controlled in such a manner that a specific change in viscosity may occur depending on a compositional change of the ink.

More specifically, the ink is prepared so as to satisfy formula (I) shown below, assuming as A cP the viscosity at 25° C. measured when the content of the solid material in the ink is 10% by weight, and assuming as B cP the viscosity at 25° C. measured when the content of the solid material in the ink is 30% by weight:

$$B/A \geq 3 \tag{I}.$$

In the present invention, the content of the solid material is noted at the two points, namely 10% by weight and 30% by weight. This is because, as a result of intensive studies made by the present inventors, it was judged to be most appropriate to select these two points as a standard for precisely representing the influence which the solid component may exert for increasing the viscosity.

Any standard point other than this condition makes it difficult to decide the optimum combination of the solid component and the other ink component media necessary for achieving the object of the present invention. Formula (I) defines a value obtained as a result of various studies on the rate of the increase in viscosity for suppressing the feathering of dots on the recording face on which the fibers are exposed, and the range of $B/A < 3$ may achieve only insufficient effect for increasing the viscosity, resulting in no effect observed for preventing the feathering of dots.

In the present invention, the effect thereof can be made remarkable when the above B/A is 3.5 or more.

The present inventors have made studies on the composition of ink in a varied range to examine the relationship between the feathering of ink on the recording face on which the fibers are exposed, the drying performance of print, and the phenomenon that the viscosity of ink increases with evaporation of a solvent. As a result, they found that the solid material added so as to satisfy the formula (I) in the above condition and the other ink component media may be combined to remarkably improve the prevention of the feathering of ink dots and the drying performance of print as compared with the conventional ink. The present invention has thus been accomplished.

By using the ink having such characteristics, it can be simultaneously achieved both to improve the prevention of the feathering of ink dots on the recording medium having a recording face on which the fibers are exposed, such as cloth or paper, and to improve the drying performance of print. As for the paper, the intended effect can be made more remarkable if it has a basis weight in the range of 30 to 200 $g/m^2$, preferably 45 to 200 $g/m^2$. The Stoeckigst sizing degree of the paper is preferably not more than 100 seconds. Moreover, good print can be obtained also on the paper having been sized and generally used in offices, such as notebooks, report paper, copying paper and letter paper.

These effects can be further promoted by specifying initial ink properties. The initial ink properties are that at 25° C. the ink has preferably a surface tension of 35 to 65 dyne/cm and a viscosity of 15 cP or less, more preferably a surface tension of 40 to 60 dyne/cm and a viscosity of 10 cP or less.

To describe the present invention in greater detail, the coloring matter used in the present invention may include water-soluble or oil-soluble dyes such as direct dyes, acidic dyes, basic dyes, food dyes, reactive dyes, solubilized vat dyes and vat dyes. Of these, particularly preferred are the water-soluble dyes in view of various properties thereof.

The content of these dyes may be determined depending on the type of liquid medium components and the properties required for ink, but, in general, may be in the range of 0.2 to 20% by weight, preferably 0.5 to 10% by weight, and more preferably 1 to 5% by weight, based on the total amount of the ink.

Secondly, the volatile solvent used in the ink of the present invention may be any of those having a vapor pressure of 1 mmHg or more at 25° C., but particularly preferred are water and lower alcohols such as methanol, ethanol, propanol, butanol and isopropanol, and ketones such as acetone.

In the present invention, the volatile solvent is used for the reason of promoting the increase in the viscosity owing to the volatilization of the solvent after the ink was adhered on a recording medium, and preventing the feathering of ink by virtue of the increase in the viscosity. Accordingly, the volatility is made to be judged by the vapor pressure of 1 mmHg or more at 25° C., based on a standard obtained as a result of intensive studies having been made paying attention to the effect thereby obtainable. The vapor pressure of 10 mmHg or more at 25° C., of the volatile solvent can achieve a still higher effect for increasing the viscosity, bringing about more preferable results.

Thirdly volatile solvents may be contained in an amount ranging from 50 to 95% by weight, preferably 60 to 95% by weight, and more preferably 70 to 95% by weight, based on the total amount of the ink.

Third, as the solid material used in the ink and having a molecular weight of 300 or more at room temperature (20° C.), which features the present invention, there can be used any of those that can be contained in the ink by dissolving them, and may be included, for example, polyethylene glycol, polyoxyethylene mono- or dialkyl ethers, polyoxyethylene alkylphenyl ethers, polyoxyethylene/polyoxypropylene block (or random) polymers and alkyl ethers thereof, aliphatic acids and salts thereof, paraffins, all sorts of sugars, etc.

Of the above materials, those particularly preferred in view of the properties may further specifically include the following four types:

(1) Polyethylene glycol:

Those having a molecular weight of 600 or more, preferably 1,000 or more, and more preferably not less than 1,500 and less than 20,000.

(2) Polyoxyethylene alkyl ethers:

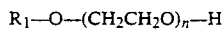

wherein $R_1$ represents a saturated or unsaturated alkyl group having 30 or less, preferably 25 or less, more preferably 20 or less of carbon atoms; and n is an integer of 10 or more, preferably 15 or more, and more preferably 20 or more.

(3) Polyoxyethylene alkylphenyl ethers:

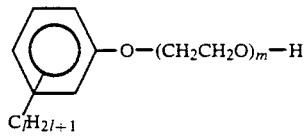

wherein $l$ is a positive integer of 12 or less; m is an integer of 10 or more, preferably 21 or more, and more preferably 26 or more.

(4) Polyoxyethylene/polyoxypropylene block polymers:

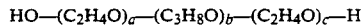

Those having an ethylene oxide content of 50% or more, preferably 60% or more, more preferably 70% or more, in % by weight.

In the present invention, the above solid material having a molecular weight of 300 or more at room temperature is used for the reasons of firstly preventing the feathering of dots on a recording face as the volatile solvent has the action of causing an abrupt increase in the viscosity of the ink when it volatilizes, and secondly achieving quick-drying to finally return to a solid on the recording face.

In order for the solid material to exhibit the above action, the molecular amount thereof is made to be 300 or more, more preferably 600 or more. The molecular amount less than 300 may result in no remarkable effect for increasing the viscosity, so that in some cases the problem of the feathering of dots on the recording medium on which the fibers are exposed can not be solved, which must be solved as aimed in the present invention. Also, the solid material may preferably be contained in an amount ranging from 5 to 35% by weight, more preferably 10 to 25% by weight.

Outline of the essential components for constituting the ink for ink-jet recording of the present invention is as described above, but, as another embodiment of the present invention, there may be included the ink in which a low viscosity solvent having a vapor pressure of 1 mmHg or less and a viscosity of 10 cP or less at 25° C. is used in combination. Examples of the low viscosity solvent may include, for example, mono- or dibutyl ethers of ethylene glycol, monoalkyl (having 1 to 4 carbon atoms) or dialkyl (having 2 to 4 carbon atoms) ethers of diethylene glycol, mono- or dialkyl (having 1 to 4 carbon atoms) ethers of triethylene glycol, mono- or dialkyl (having 1 to 4 carbon atoms) ethers of tetraethylene glycol, monoalkyl (having 1 to 4 carbon atoms) ethers of dipropylene glycol, mono- or dialkyl (having 1 to 4 carbon atoms) ethers of tripropylene glycol, tetrahydrofurfuryl alcohol, N-methyl-2-pyrrolidone, 1,3-dimethyl-2-imidazolidinone, etc.

The above examples of the solvent are particularly preferred for the ink of the present invention, but, in the present invention, the solvent is by no means limited to these exemplified ones.

In the present invention, the above low viscosity solvent is used for the purpose of more improving the ejection stability under a low temperature and low humidity condition, and therefore may not necessarily be used depending on the system of ink-jet recording or the structure of the print head. When they are used, they may be contained in an amount ranging from 1 to 30% by weight, preferably 3 to 20% by weight, and more preferably 4 to 16% by weight, based on the total amount of the ink.

The above-described are the essential components constituting the ink for ink-jet recording of the present invention, but there may be optionally further added without any inconvenience a variety of additives such as a solvent, a pH adjuster, a surface active agent, a rust preventive, an antiseptic and mildewproofing agent, an antioxidant, an evaporation promotor and a chelating agent which are conventionally known.

As a means for using more effectively the ink of the present invention, the recording may be carried out by heating the ink.

The ink used in the present invention contains in combination the volatile solvent and solid material as described above, and thus the invention is characterized by using the ink that may cause abrupt increase in the viscosity in the course of the evaporation of the volatile component after recording, so that both of the prevention of the feathering of print and the drying performance can be achieved by such ink.

Because of this mechanism, it may sometimes occur that the ink of this type, which tends to cause the phenomenon of viscosity increase inside a nozzle at a low temperature, causes a poorness in ejection stability depending on the condition or causes a lowering of the rapid-drying property because of the suppression of the evaporation of the volatile solvent. Even at a room temperature, it may also sometimes occur that the evaporation of the volatile component proceeds at the tip of the nozzle during operation of a printer to cause the poor ejection.

For the above reasons, the heating-up in the present invention provides a condition for carrying out the recording more effectively. Specific temperature elevation for the heating-up may be higher than room temperature to exert the effect, and may preferably be at least 40° C. or more. Depending on the type of the ink-jet recording head, the temperature may be sometimes required to be increased to 60° C. or more, or further increased to 80° C. or more.

The condition for the heating-up in the present invention may be set so that the ink may not be at a temperature lower than a certain level during recording, or a plurality of temperature conditions may be set such that the temperature is particularly made high at the start of the recording and gradually lowered to a standard temperature. This can be set in an optimum state by taking balance of the ink with a printer system. Accordingly, there is no particular limitation.

In the present invention, the ink may be heated by any means. For example, the heating can be arbitrarily carried out by a method such that a heat resistance element capable of electrically controlling the heat generation is disposed at an ink solution chamber located in the vicinity of the nozzle. It is also possible to control the ink temperature by employing a temperature sensor such as a thermister in the ink solution chamber to arbitrarily control the temperature for setting the intended viscosity.

The present invention has made it possible not only to achieve the same operability of ink in feeding systems or the like as in that of the conventional liquid type ink, but also to solve at the same time the problems of the feathering and the problem of the drying performance of print.

The present invention also makes it possible to carry out recording with good ejection performane, and achieves at the same time the improvement in the feathering of ink dots that may occur in the recording medium having the recording face on which cellulose fibers are exposed, such as cloth and paper, and the improvement in the drying performance of print. It becomes further possible to obtain good print also on the paper having been sized and generally used in offices, such as notebooks, report paper, copying paper and letter paper.

The respective ink properties defined in the present invention are measured by using, with regard to viscosity, VISCONIC ELD produced by Tokyo Keiki Co., Ltd., and, with regard to surface tension, KYOWA CBVP SURFACE TENSIOMETER A-1 produced by Kyowa Kagaku Co., Ltd.

EXAMPLES

The present invention will be described below in greater detail by employing Examples and Comparative Examples. In the following, part and % are based on weight.

EXAMPLE 1

| | |
|---|---|
| C.I. Food Black 2 | 5 parts |
| Polyethylene glycol (average molecular weight: 2,000) (solid material) | 10 parts |
| Morpholine stearate (average molecular weight: 370) (solid material) | 0.1 part |
| Water | 90 parts |
| Nonionic surface active agent | 0.1 part |
| (trade name: Emulgen PP-150, available from Kao Corporation) | |

All the above components were mixed. To the resulting solution an aqueous 0.1% sodium hydroxide solution was added to adjust pH value to 8.3 and stirred for 5 hours, followed by filtering under pressure with use of Fluoropore Filter FP-100 (trade name, produced by Sumitomo Electric Industries, Ltd.) to obtain ink (A) of the present invention. Physical properties of ink (A) thus obtained and the effect for increasing the viscosity, exerted by the solid materials, are shown in Table 1 following.

Next, the above ink (A) was set in an ink-jet printer BJ-80 (trade name, produced by Canon K.K.) that carries out recording by utilizing a heat element, and printing was performed on copying paper and bond paper to evaluate recording performances, the feathering and the drying performance. The results are shown in Table 3. The ejection environment was controlled under two conditions of 25° C., 60% RH and 15° C., 40% RH to evaluate the ejection performance to obtain the results as shown in Table 3.

EXAMPLES 2 to 6

| Ink (B): | |
|---|---|
| C. I. Direct Black 154 | 3 parts |
| Polyoxyethylene (addition molar number: 20) stearyl ether (molecular weight: 1,136) (solid material) | 10 parts |
| Polyethylene glycol (average molecular weight: 20,000) (solid material) | 0.05 parts |
| Glucose (molecular weight: 180) (solid material) | 1 part |
| Water | 89 parts |
| Ink (C): | |
| C.I. Acid Red 35 | 2 parts |
| Polyoxyethylene nonylphenyl ether (molecular weight: 300 or more) (solid material; trade name: Emulgen 985, available from Kao Corporation) | 10 parts |
| Ethanol | 5 parts |
| Urea | 1 part |
| Water | 84 parts |
| Ink (D): | |
| C.I. Direct Blue 86 | 2 parts |
| Polyoxyethylene/polyoxypropylene block polymer (Polyoxyethylene content: 85%; average molecular weight of polyoxypropylene: 1,200) | 10 parts |
| Glycerol | 2 parts |
| Ethylene glycol | 5 parts |
| tetraethylene glycol dimethyl ether | 1 part |
| Water | 82 parts |
| Ink (E): | |
| C.I. Direct Yellow 142 | 3 parts |
| Polyethylene glycol (average molecular weight: 4,000) (solid material) | 20 parts |
| Diethylene glycol monophenyl ether | 2 parts |
| Acetone | 1 part |
| Water | 77 parts |
| Ink (F): | |
| C.I. Reactive Red 24 | 5 parts |
| Polyethylene glycol (average molecular weight: 1,000) (solid material) | 10 parts |
| 1,3-Dimethyl-2-imidazolidinone | 14 parts |
| N-methyl-2-pyrrolidone | 2 parts |
| Water | 90 parts |

Evaluation of each ink and evaluation of recording performances were made in the same manner as in Example 1 except that the above ink (B) to ink (F) were used in place of ink (A) in Example 1. Results obtained are shown in Table 1 and Table 3.

COMPARATIVE EXAMPLE 1

Procedures entirely same as in Example 5 were repeated except that polyethylene glycol (average molecular weight: 600) was used in place of polyethylene glycol (average molecular weight: 4,000) used in Example 5, to obtain ink (G) used for comparison.

Next, Example 1 was repeated to make measurement of ink properties and evaluation of recording performances, except that ink (G) was used in place of ink (A) used in Example 1. Results obtained are shown in Table 1 and Table 3.

COMPARATIVE EXAMPLE 2

Procedures entirely same as in Example 6 were repeated except that polyethylene glycol (average molecular weight: 300) which is liquid at room temperature was used in place of polyethylene glycol (average molecular weight: 1,000) used in Example 6, to obtain ink (H) used for comparison.

Next, Example 1 was repeated to make measurement of ink properties and evaluation of recording performances, except that ink (H) was used in place of ink (A) used in Example 1. Results obtained are shown in Table 1 and Table 3.

TABLE 1

| | Surface tension (dyne/cm) | Viscosity (c.P.) | Value A | Value B | B/A |
|---|---|---|---|---|---|
| Examples: | | | | | |
| Ink (A) | 55 | 3.3 | 3.5 | 13.6 | 3.9 |
| Ink (B) | 41 | 4.0 | 4.1 | 16.4 | 4.0 |
| Ink (C) | 40 | 11.5 | 11.6 | 59.2 | 5.1 |
| Ink (D) | 42 | 6.1 | 6.2 | 27.3 | 4.4 |
| Ink (E) | 46 | 9.1 | 4.1 | 19.5 | 4.8 |
| Ink (F) | 48 | 2.9 | 3.1 | 10.9 | 3.5 |
| Comparative Examples: | | | | | |
| Ink (G) | 47 | 4.1 | 2.4 | 6.2 | 2.6 |
| Ink (H) | 49 | 2.6 | — | — | — |

EXAMPLES 7 TO 10, COMPARATIVE EXAMPLES 3 AND 4

Using ink (A), ink (B), ink (C) and ink (D) in Examples 1 to 4 and ink (G) and ink (H) in Comparative Examples 1 and 2, the heating-up printing was carried out with use of the printer same as in Example 1.

Heating-up operation in Examples and in a part of Comparative Examples was carried out by mounting a thermister of positive characteristics (trade name: Posistar; Curie point: 40°, 60°, 80°; produced by Murata Manufacturing Co., Ltd.) around an ink solution chamber and controlling the applied voltage.

The conditions set for the above and the evaluation results are shown in Table 2 and Table 3, respectively.

TABLE 2

| | Heating-up temperature |
|---|---|
| Example 7: | 40° C. |
| Example 8: | 40° C. |
| Example 9: | 80° C. |
| Example 10: | 60° C. |
| Comparative Example 3: | 60° C. |
| Comparative Example 4: | 60° C. |

TABLE 3

| | | Fixing performance*1 | | feathering rate*2 | | Ejection performance*3 | |
|---|---|---|---|---|---|---|---|
| | Ink | Bond paper | Copying paper | Bond paper | Copying paper | 25° C., 60% RH | 15° C., 60% RH |
| Example: | | | | | | | |
| 1 | (A) | A | A | A | A | A | B |
| 2 | (B) | A | A | A | A | A | B |
| 3 | (C) | B | A | A | A | A | A |
| 4 | (D) | A | A | A | A | A | B |
| 5 | (E) | B | A | A | A | A | B |
| 6 | (F) | A | A | A | A | A | A |
| 8 | (A) | A | A | A | A | A | A |
| 8 | (B) | A | A | A | A | A | A |
| 9 | (C) | A | A | A | A | A | A |
| 10 | (D) | A | A | A | A | A | A |
| Comparative Examples: | | | | | | | |
| 1 | (G) | D | C | B | C | B | C |
| 2 | (H) | A | A | C | C | B | C |
| 3 | (G) | C | B | C | C | B | B |
| 4 | (H) | A | A | C | C | D | D |

*1: Print was rubbed with a filter paper (trade name: No. 5C; available Kagakusangyo Co., Ltd.), 10 seconds and 30 seconds after printing. A . . . Not blurred by rubbing after 10 seconds B . . . A little blurred by rubbing after 10 seconds C . . . A little blurred by rubbing after 30 seconds D . . . Greatly blurred by rubbing after 30 seconds
*2: Number of feathered dots among 300 printed dots was evaluated in percentage. A . . . Less than 10% of feathering B . . . Not less than 10% and less than 20% of feathering C . . . More than 20% of feathering
*3: Evaluated was the state of ejection from 24 nozzles, observed when the print head was allowed to stand for 5 minutes without applying any capping and thereafter printing was carried out for 1 minute. A . . . Ejected stably from all the nozzles. B . . . Unstable ejection being observed in 1 or 2 nozzles, but restored immediately. C . . . Unstable ejection being observed partly in the nozzles. D . . . Unstable ejection or no ejection being observed in all the nozzles.

The ink for ink-jet recording of the present invention is an ink that has no problem in the operability of ink, may hardly cause feathering, and has good drying performance of print.

Also, when the recording is carried out of course on coated paper and also on cloth or paper having a recording face on which fibers are exposed, the dots on the recording face can be substantially free from feathering, and there can be achieved very good drying performance of print.

Moreover, there can be realized an ink-jet recording process that can be carried out with good stability, may not cause any clogging, and can achieve good ejection stability.

The clogging and the ejection stability can be more improved when the recording is carried out by raising the temperature of the ink.

We claim:

1. An ink-jet recording process, comprising carrying out recording by adhering droplets of ink on a recording medium, wherein said recording medium comprises a recording face on which fibers are exposed, and said ink comprises a coloring matter, a volatile solvent having a vapor pressure of at least 1 mmHg at 25° C., and a material which is solid at room temperature and has a molecular weight of at least 300, wherein said ink satisfies formula (I) shown below, assuming viscosity as A cP at 25° C. measured when the content of the solid material in said composition is 10% by weight, and assuming viscosity as B cP at 25° C. measured when the content of the solid material in said composition is 30% by weight:

$$B/A \geqq 3 \qquad (I)$$

and carrying out recording with an ink temperature of at least 40° C.

2. The ink-jet recording process of claim 1, wherein said recording medium is a sheet of paper having been sized.

3. The ink-jet recording process of claim 1, wherein said ink has a surface tension of 35 to 65 dyne/cm and a viscosity of 15 cP or less at 25° C.

4. The ink-jet recording process of claim 1, wherein said ink further contains a low-viscosity solvent having a vapor pressure of less than 1 mmHg and a viscosity of 10 cP or less at 25° C.

5. The ink-jet recording process of claim 4, wherein said low viscosity solvent is contained in an amount ranging from 1 to 30% by weight based on the total amount of the ink.

6. The ink-jet recording process of claim 1, wherein said volatile solvent has a vapor pressure of 10 mmHg or more at 25° C.

7. The ink-jet recording process of claim 1, wherein said volatile solvent comprises any one of water, a lower alcohol or a ketone.

8. The ink-jet recording process of claim 1, wherein said volatile solvent is contained in an amount ranging from 50 to 95% by weight based on the total amount of the ink.

9. The ink-jet recording process of claim 1, wherein said solid material has a molecular weight of 600 or more.

10. The ink-jet recording process of claim 1, wherein said solid material is at least one selected from the group consisting of polyethylene glycol, polyoxyethylene alkyl ether, polyoxyethylene alkylphenyl ether and a polyoxyethylene/polyoxypropylene block polymer.

11. The ink-jet recording process of claim 1, wherein said solid material is contained in an amount ranging from 5 to 25% by weight based on the total amount of the ink.

12. An ink-jet recording process of claim 1, wherein said coloring matter is a water-soluble dye.

13. An ink-jet recording process of claim 1, wherein said solid material is water-miscible, and is selected from the group consisting of polyethylene glycol, polyoxyethylene alkyl ether, polyoxyethylene alkylphenyl ether and polyoxyethylene/polyoxypropylene block polymer.

14. An ink-jet recording process, comprising carrying out recording by adhering droplets of ink on a recording medium, wherein said ink comprises a coloring matter, from 60–95 wt. % of a volatile solvent having a vapor pressure of at least 1 mmHg at 25° C., and from 5–35 wt. % of a material which is solid at room temperature and has a molecular weight of at least 300, wherein said ink satisfies formula (I) shown below, assuming viscosity as A cp at 25° C. measured when the content of the solid material in said composition is 10% by weight, and assuming viscosity as B cp at 25° C. measured when the content of the solid material in said composition is 30% by weight:

$$B/A \geqq 3 \qquad (I),$$

and carrying out recording with an ink temperature of at least 40° C.

15. The ink-jet recording process of claim 14, wherein said recording medium has a recording face on which fibers are exposed.

16. The ink-jet recording process of claim 14, wherein said recording medium is a sheet of paper having been sized.

17. The ink-jet recording process of claim 14, wherein said ink has a surface tension of 36 to 65 dyne/cm and a viscosity of 50 cP or less at 25° C.

18. The ink-jet recording process of claim 14, wherein said volatile solvent has a vapor pressure of 10 mmHg or more at 25° C.

19. The ink-jet recording process of claim 14, wherein said volatile solvent is water.

20. The ink-jet recording process of claim 14, wherein said volatile solvent is contained in an amount ranging from 50 to 95% by weight based on the total amount of the ink.

21. The ink-jet recording process of claim 14, wherein said solid material has a molecular weight of 600 or more.

22. The ink-jet recording process of claim 14, wherein said solid material is at least one selected from the group consisting of polyethylene glycol, polyoxyethylene alkyl ether, polyoxyethylene alkylphenyl ether and a polyoxyethylene/polyoxypropylene block polymer.

23. The ink-jet recording process of claim 14, wherein said solid material is contained in an amount ranging from 10 to 25% by weight based on the total amount of the ink.

24. The ink-jet recording process of claim 14, wherein the heating-up temperature is 60° C. or more.

25. The ink-jet recording process of claim 14, wherein the heating-up temperature is 80° C. or more.

26. The ink-jet recording process of claim 14, wherein said ink further contains a low-viscosity solvent having a vapor pressure of less than 1 mmHg and a viscosity of 10 cP or less at 25° C.

27. The ink-jet recording process of claim 26, wherein said low viscosity solvent is contained in an amount ranging from 1 to 30% by weight based on the total amount of the ink.

28. An ink-jet recording process of claim 14, wherein said coloring matter is a water-soluble dye.

29. An ink-jet recording process of claim 14, wherein said solid material is water-miscible, and is selected from the group consisting of polyethylene glycol, polyoxyethylene alkyl ether, polyoxyethylene alkylphenyl ether and polyoxyethylene/polyoxypropylene block polymer.

* * * * *

UNITED STATES PATENT AND TRADEMARK OFFICE
CERTIFICATE OF CORRECTION

PATENT NO. : 5,124,718
DATED : June 23, 1992
INVENTOR(S) : Koike et al.

It is certified that error appears in the above-identified patent and that said Letters Patent is hereby corrected as shown below:

COLUMN 1:

Line 11, "process" should read --a process--; and
   Line 66, "agents." should read --agent.--.

COLUMN 6:

Line 1, "aimed in" should read --an aim of--.

COLUMN 7:

Line 36, "performane," should read --performance,--.

COLUMN 11:

Line 5, delete "of course".

COLUMN 12:

Line 21, "300 ," should read --300,--; and
   Line 40, "36 to 65" should read --35 to 65--.

Signed and Sealed this

Second Day of November, 1993

Attest:

BRUCE LEHMAN

Attesting Officer     Commissioner of Patents and Trademarks